US006901389B1

United States Patent
Madison et al.

(10) Patent No.: US 6,901,389 B1
(45) Date of Patent: May 31, 2005

(54) METHOD TO AUGMENT IMAGERY TO DISPLAY 3-D PROBABILISTIC OBJECT LOCATIONS

(75) Inventors: Richard Wade Madison, Mission Viejo, CA (US); Todd Joseph Furlong, Goffstown, NH (US); John Franklin Walker, Goffstown, NH (US); John Franklin Ebersole, Jr., Bedford, NH (US); John Franklin Ebersole, Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 342 days.

(21) Appl. No.: 10/123,315

(22) Filed: Apr. 16, 2002

Related U.S. Application Data

(63) Continuation-in-part of application No. 09/513,152, filed on Feb. 25, 2000, now Pat. No. 6,578,017.
(60) Provisional application No. 60/284,311, filed on Apr. 17, 2001.

(51) Int. Cl.[7] .............................. G06F 15/18; G06G 7/00
(52) U.S. Cl. ................................................ 706/5; 706/3
(58) Field of Search .......................... 706/5, 3

(56) References Cited

U.S. PATENT DOCUMENTS

| | | | | | |
|---|---|---|---|---|---|
| 5,222,155 | A | * | 6/1993 | Delanoy et al. | 382/30 |
| 5,870,495 | A | * | 2/1999 | Mancuso et al. | 382/199 |
| 6,404,920 | B1 | * | 6/2002 | Hsu | 382/190 |
| 2002/0035323 | A1 | * | 3/2002 | Saha et al. | 600/410 |

OTHER PUBLICATIONS

Piat et al, "Degrees of Confidence Fusion in a probabilistic Context Application to Rage Data Fusion", IEEE IROS Nov. 1996.*

* cited by examiner

Primary Examiner—George Davis
(74) Attorney, Agent, or Firm—Brian M. Dingman, Esq.; Mirick, O'Connell, DeMallie & Lougee, LLP

(57) ABSTRACT

The invention is a method for augmenting images to highlight regions where objects of interest are likely to appear. The method uses fuzzy set theory to classify locations that may contain objects of interest, uses fog volumes to represent the fuzzy sets in three dimensions, and renders these fog volumes from the vantage point of the image to provide a colored overlay with which to augment the image. Where fog volumes of different colors overlap in an image, the invention renders the overlapping area using cross-hatching, so that the multiple colors appear side by side rather than blending to make a third color.

17 Claims, 9 Drawing Sheets ly related to this membership
METHOD TO AUGMENT IMAGERY TO DISPLAY 3-D PROBABILISTIC OBJECT LOCATIONS

CROSS REFERENCE TO RELATED APPLICATION

This application claims priority of Provisional patent application 60/284,311 filed Apr. 17, 2001 and is a continuation in part of application Ser. No. 09/513,512 filed on Feb. 25, 2000 now U.S. Pat. No. 6,578,017.

GOVERNMENT RIGHTS

This invention was made in part with Government support under Contract Number M67004-00-C-0013 awarded by the Department of the Army. The Government has certain rights in the invention.

FIELD OF THE INVENTION

This invention relates to computer graphics, fuzzy logic, and object detection. It defines a way to augment imagery with a graphical representation of a fuzzy membership function to facilitate object detection by a human.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

Fuzzy set theory classifies objects by how much they belong to sets, not by whether they belong. A fuzzy set is defined by a membership function, which maps points in a feature space to a level of membership in the set. Such classification is useful when a set's boundaries are difficult to define, as is the case for boundaries between sub-species, activities, emotions, and to the point, regions in an image. Of particular interest is the classification of regions of an image into one of two sets: regions that are likely to contain objects of interest and those that are not.

Context clues, prior knowledge, automatic filters, third party observations, or other information may indicate that objects are likely to exist at certain points or regions in an image. Several sources of uncertainty, such as measurement errors, object movement, conflicting information, unreliable sources, and vague correlation with context clues reduce confidence in the precise locations given by the various information sources. Instead of classifying these precise locations as "object likely" or "object unlikely", it may be more accurate to define "object likely" as a fuzzy set. Regions near where information predicts objects of interest would have high membership. Surrounding regions would have decreasing membership, depending on the distance over which the predictive information is likely to misjudge an object's location. Regions with no nearby indications would have no membership.

SUMMARY OF THE INVENTION

The invention is a method for augmenting images to highlight regions where objects of interest are likely to appear. The method uses fuzzy set theory to classify locations that may contain objects of interest, uses visible display parameter means such as graphical "fog volumes" to represent the fuzzy sets in three dimensions, and renders these representations (fog volumes) from the vantage point of the image, preferably to provide a colored overlay with which to augment the image. Where fog volumes of different colors overlap in an image, the invention preferably renders the overlapping area using a different display parameter such as cross hatching, so that the multiple colors appear side by side rather than blending to make a third color.

DETAILED DESCRIPTION OF THE PREFERRED EMBODIMENTS OF THE INVENTION

Figure 1A:
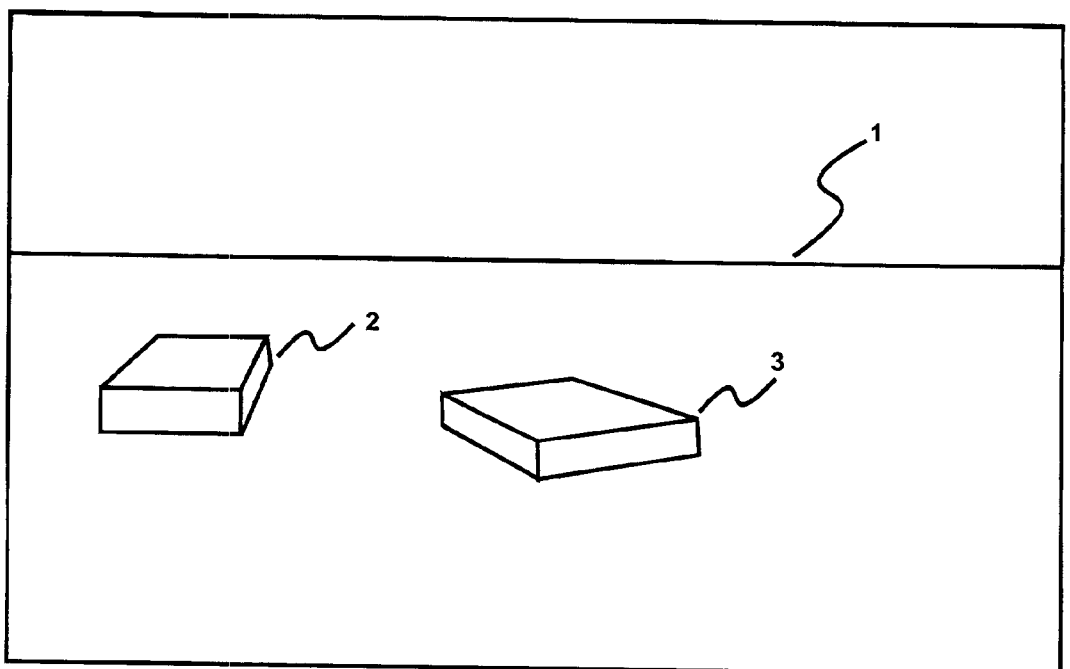
FIG. 1 comprises two views of an image marked with two fuzzy membership functions to indicate where two types of objects are likely to appear.
Figure 1B:
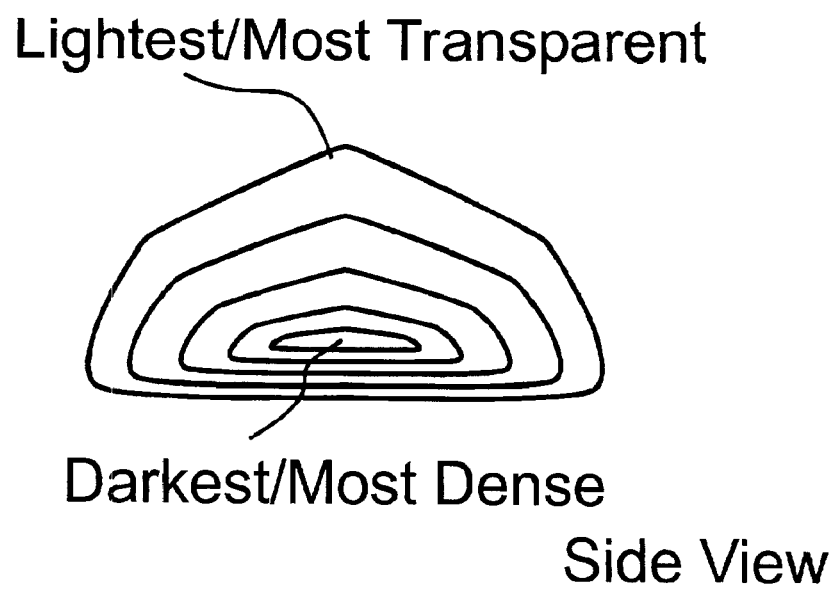
Figure 1C:
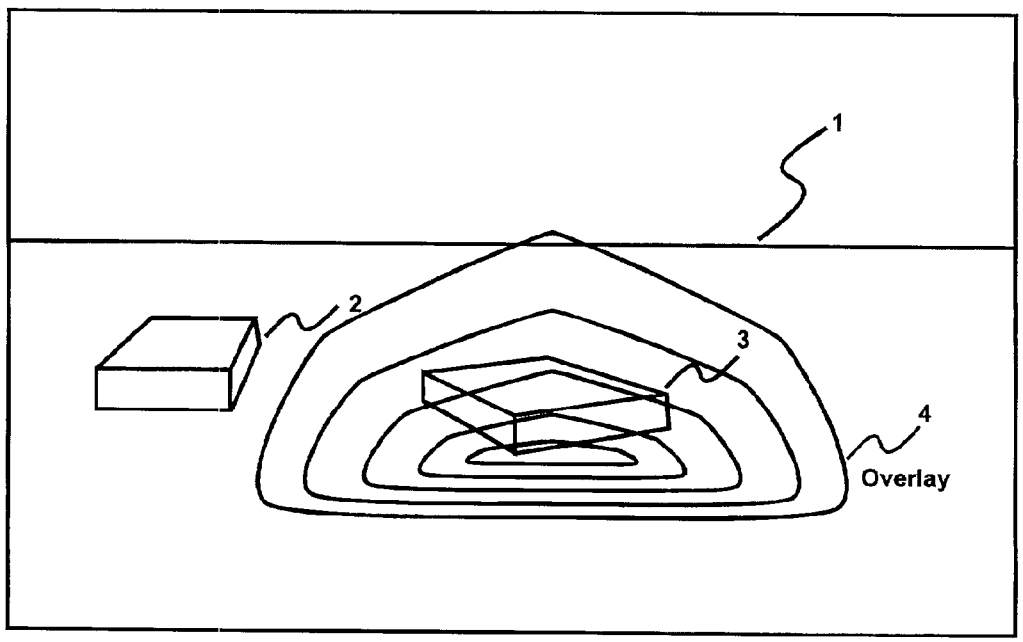

The present invention is a method for augmenting images to highlight regions where objects of interest are likely to appear. This highlighting can be accomplished with any useful visual means that is appropriate for the type of display device. FIG. 1a shows a perspective-view line representation of a visual scene with a horizon (item 1) and two objects, which represent buildings in this example (items 2 & 3). FIG. 1b shows schematically a variable opacity overlay that is how regions of probable interest are marked in the preferred embodiment. This variable opacity overlay is described in detail in the following sections. FIG. 1c shows a combined view where one of the buildings (item 3) has been selected to be of interest and is being marked by combining the variable opacity overlay (item 4) with the background image.

Figure 1D:
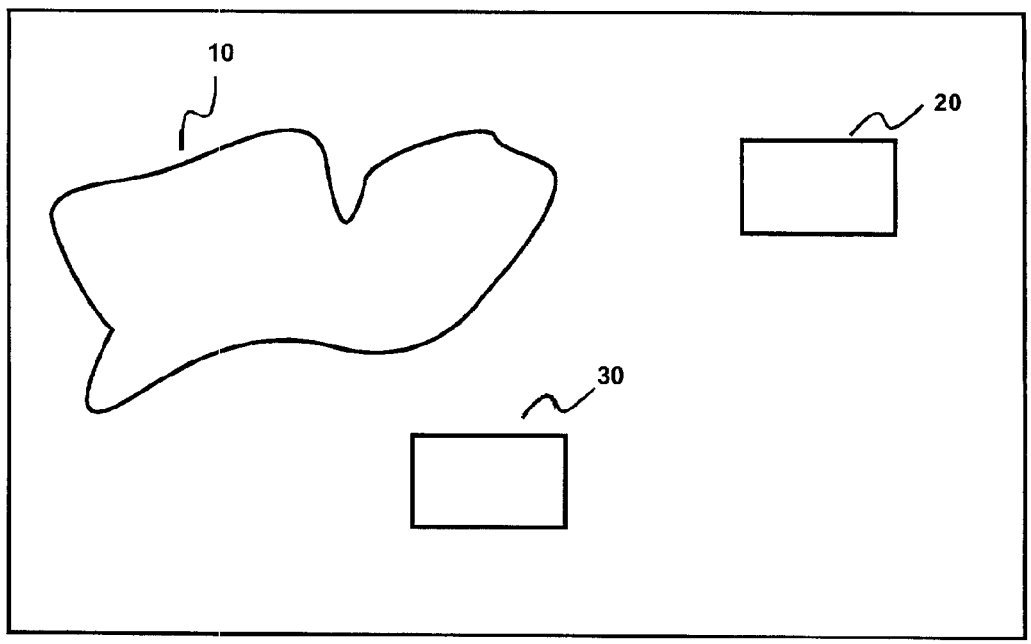
Figure 1E:
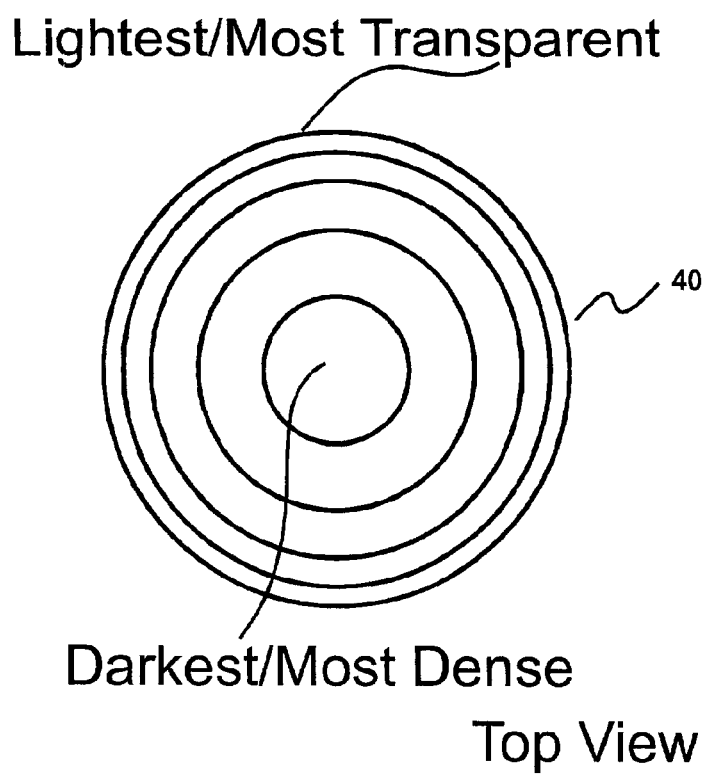
Figure 1F:
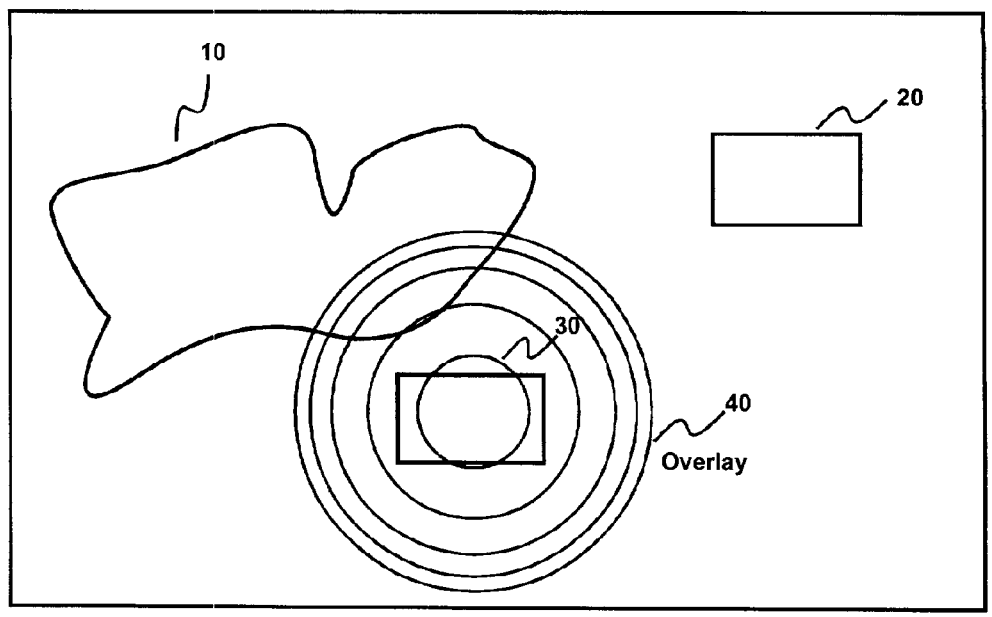

Similarly, FIG. 1d shows an overhead view line representation of another (different) visual scene with a lake (item 10) and two objects, which again represent buildings (items 20 & 30). FIG. 1e shows the overhead view of a variable opacity overlay 40 that is used to mark regions of probable interest. FIG. 1f shows a combined view where one of the buildings (item 30) has been selected to be of interest and is being marked by combining the variable opacity overlay (item 40) with the background image.

The preferred embodiment of this invention uses variable coloration—with or without variable opacity—and the intensity of the color at any particular location corresponds to the confidence that an object of interest lies at that location. Other display parameters (such as variable gray level or cross-hatching, for example) may also be used to graphically represent the probability that an object is at a location in the display.

The preferred embodiment of the present invention consists of four steps. First, define locations in the image where objects of interest are likely to appear. Second, define a membership function for different locations in the image, indicating the probability that an object of interest will appear at a particular point, as a function of that point's distance from the location. Third, define a graphical "fog volume" whose density is related to this membership function, and which encompasses all points whose membership exceeds some threshold. Fourth, render the fog volume from the vantage point of the image, and blend the results onto the image. The following describes the preferred embodiment of each of those four steps.

Defining Locations

The preferred embodiment of the invention defines three-dimensional locations where objects of interest are likely to appear. The coordinate system for defining these locations is the same one used to describe the position and orientation of the vantage point of the image, when rendering the augmented image. In many computer graphics applications, the vantage point and the scene geometry are known. A location identified in imagery seen from any known vantage point can be converted into three dimensions by casting a ray from the vantage point, through a point on an image, to an intersection with the scene geometry. In other applications, the geometry of a three dimensional scene and the vantage point of its image can be created, and the likely object locations defined within that geometry. In still other applications, where an image depicts an inherently two-dimensional scene, such as a map, it is sufficient to define likely object locations in two dimensions.

In the preferred embodiment of the invention, the locations where objects are likely to occur can be points, lines, or areas. Point locations are defined along the ground in a scene of known or assumed geometry. Lines and multi-segmented lines are defined by an ordered set of such points. Areas are also defined by an ordered set of ground points, but are interpreted to form a closed polygon. A user would define the shape of a location to best match the information that predicts an object at that location. For instance, previous experience may indicate that an object is found on a road, by a tree, or in a lake. These three types of locations might be represented as a line, a point, and an area respectively.

Defining Membership Functions

Fuzzy logic allows an arbitrary membership function to convert from a feature space to a membership value. In the present application, the feature space consists of a single value—distance from an indicated location. The preferred embodiment uses a scaled Gaussian distribution to describe this membership. Each membership function has a maximum value and a falloff distance. The Gaussian is scaled horizontally and shifted vertically so that it has a value of zero at the fall-off distance. It is then scaled to attain the desired maximum value. Points whose distance from the predicted location is some fraction of the falloff distance are assigned membership according to this curve. Points farther from the location are assigned zero membership. Points on or inside the predicted location are assigned the maximum value, at the center of the Gaussian distribution.

The preferred embodiment of the invention uses a single membership function for all locations, varying maximum value and fall-off distance parameters to indicate regions of varying confidence in object identification and position reporting.

Defining a Fog Volume

A fog volume is a computer graphics construct used to simplify rendering a cloud of particles. The fog volume comprises a description of a closed surface and a description of the density of particles contained inside the surface. One can calculate the appearance of a point on the surface of the volume, as seen from a vantage point, by casting a ray from the vantage point, through the point of interest, and determining how the particles inside the volume affect the ray as it travels through the volume. The effect can be determined from the density function rather than by testing individual particles. For a smooth density distribution, the appearance of points on the surface varies smoothly, so it is sufficient to define the curve by a sparse set of points, calculate the appearance at those points, and blend them to determine the appearance of the remaining surface. These two simplifications make fog volume rendering much more efficient than rendering individual particles.

The preferred embodiment of the invention defines the fog volume surface as a polygonal mesh. The process consists of defining the on-ground perimeter of the fog volume, defining additional "rings" at heights above the perimeter, and optionally defining a cap for the fog volume. The underside of the volume is implicitly defined by the terrain model, to which the volume is attached. These steps are described below.

Defining a Fog Volume Perimeter

The location of interest is defined by a vertex, or an ordered set of vertices defining one or more connected line segments, or an ordered set of vertices defining a closed curve. In the preferred embodiment, the height coordinate of these vertices is defined so as to place the vertices on the surface of a terrain model. The set of vertices and any connections between them is referred to as the skeleton. An idealized perimeter for this skeleton consists of a closed curve whose points are all at a fixed horizontal distance, equal to the fall-off distance of the membership function discussed above, from the skeleton. The fog volume's perimeter is defined as a closed curve by declaring an ordered set of vertices along such an idealized perimeter, setting the height coordinate of each to set it on the surface of the terrain model. To determine exact placement of vertices along the idealized perimeter, the preferred embodiment uses a different process, depending on the shape of the skeleton.

In the embodiment, for point locations, 16 vertices are evenly spaced at 22.5 degree angles along the circular perimeter. For line-segment locations, where the idealized perimeter consists of two semi-circles connected by parallel lines, 9 vertices are spaced evenly at 22.5 degree angles along each of the two arcs, the end points of each being sufficient to define the parallel lines as well.

For area locations, a number of vertices are placed on the perimeter at each skeleton vertex, depending on how the skeleton bends at that vertex. When projected onto a horizontal plane, each skeleton vertex represents a concave bend, a convex bend, or no bend in the skeleton. Where the bend is concave, the idealized perimeter comes to a point at the intersection of lines parallel to the two lines connecting the skeleton vertices to the vertex causing the concave bend and offset from them by the membership function's fall-off distance. A single perimeter vertex is defined at this point. Alternately, the vertex can be placed along the angle bisector of the bend, at the falloff distance. The latter does not follow the idealized perimeter, but may be more efficient to calculate. When a bend is convex, the idealized perimeter forms an arc at the fall-off distance, connecting line segments that are parallel to the skeleton segments forming the bend. Two perimeter vertices are defined where the arc connects to these two segments, at the intersections of the arc with lines through the skeleton vertex, perpendicular to the two connected skeleton segments. Enough additional vertices are defined, evenly spaced along the arc, so that the interval between vertices does not exceed 22.5 degrees, and that removing one vertex would violate this constraint. When a skeleton vertex provides no bend, two vertices are defined, at the fall-off distance from the skeleton, on a line through the skeleton vertex and perpendicular to the skeleton. The set of perimeter vertices are ordered in the order in which they appear along the idealized perimeter, which follows the order of the skeleton vertices.

For locations that are multi-segmented lines, a combination of the above techniques is used. Semi-circles at each endpoint are filled in the same way as for single-segment lines. Each bend in the line produces both a concave and a convex bend, so the vertices for each are created. To order the perimeter vertices, the idealized perimeter is traversed in a clockwise or counterclockwise direction, generating perimeter vertices of one semi-circle, the angles on one side of the line, the second semi-circle, and finally the angles on the other side of the line.

The preferred embodiment of the invention defines perimeter vertices along the surface of the terrain model. The connections between these vertices are not anchored to the ground. The result is that fog volumes may cut through terrain or fly over valleys. There are two obvious ways to remedy this. The first is to add perimeter vertices along connections between skeleton vertices. For instance, skeleton segments could be split into sub-segments of some maximum length, and a pair of perimeter vertices defined at each node between sub-segments. These might lie along lines perpendicular to the skeleton, as for no-bend skeleton vertices above. Alternately, they might lie along lines whose angles to the skeleton vary linearly between the angles to the original perimeter vertices at each end of the segment. The new perimeter vertices could be anchored to the ground, providing much truer terrain following. Alternately, if the terrain is modeled as a mesh, perimeter vertices could be defined wherever the idealized perimeter crossed a boundary in the terrain mesh.

Defining a Fog Volume Wall

Figure 2:
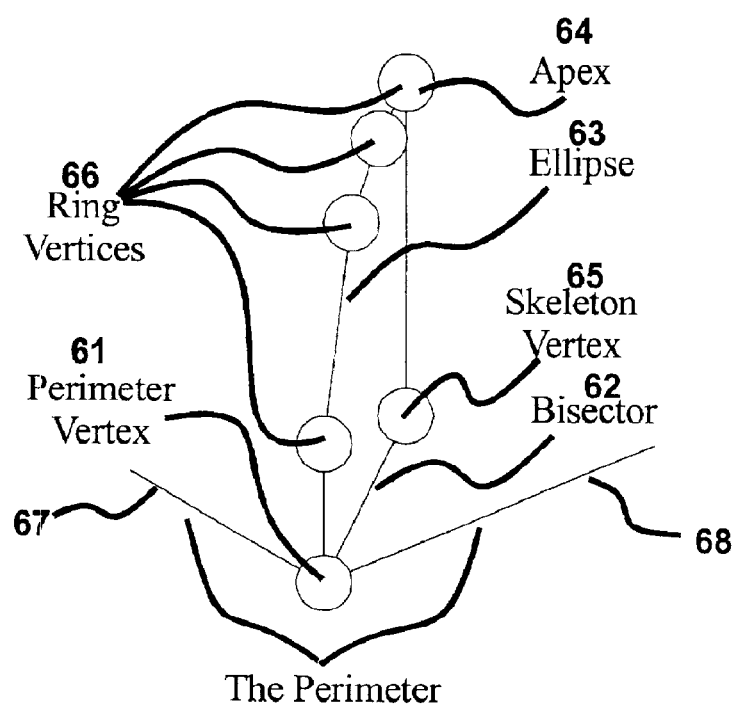
FIG. 2 is a diagram of a column of vertices along the fog volume mesh.

The fog volume perimeter is next converted into a wall, consisting of a number of vertically spaced "rings". The lowest ring is the actual perimeter. The remaining rings each include one vertex per perimeter vertex. These new vertices in the higher rings are created as illustrated in FIG. 2. Projected into the horizontal, the segments (67 and 68) that intersect at each perimeter vertex (item 61) form an angle. A vertical plane through the bisector (item 62) of this angle is defined. A quarter-ellipse (item 63) in this plane is created, rising vertically from the perimeter vertex, curving toward the interior of the perimeter, and ending horizontally at the apex (item 64), which is at a specified height (defined as the "height" of the fog volume), directly above a skeleton vertex (item 65). Vertices are generated at various heights (item 66) along this ellipse (item 63), and the vertices at each height on the ellipses of the several perimeter vertices are connected into rings.

In the preferred embodiment, the fall-off distance is chosen as the apex height. However, a different fall-off value could be used, to indicate a discrepancy in confidence in the vertical and horizontal accuracy of predictive information.

There are any number of options for determining vertical spacing between rings. For instance, rings can be placed at fixed vertical distances, or at fixed fractions of ellipse height. The preferred embodiment uses an exponential function to set ring heights. If there are N rings, then the height ring n, as a fraction of the ellipse height, is given by $(n/N)^P$, where P is a value greater than 1. This has the effect of concentrating rings lower on the ellipse, where the receding ground causes the appearance of the fog volume to change rapidly.

Figure 3:
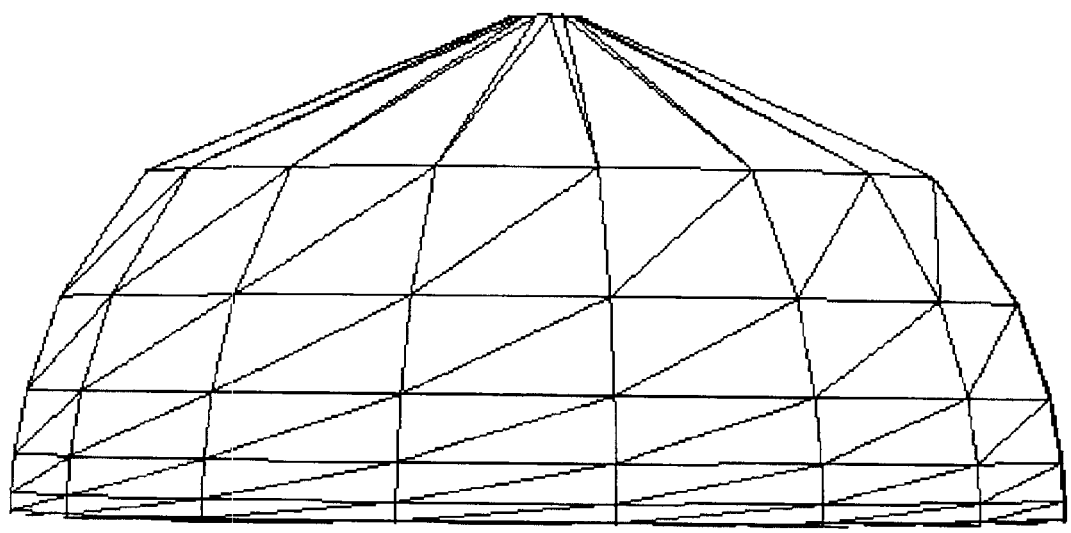
FIG. 3 is an image showing the meshes of two fog volumes.

The set of rings can now be used to generate a polygon mesh, preferably a quadrilateral or triangle mesh, as depicted in FIG. 3. To serve as a closed surface, it requires a top and a bottom.

Defining a Fog Volume Cap

The top edge of the just-defined fog volume wall has the same geometry as the location skeleton. Thus, locations that are shaped as points or lines are closed above, while area-shaped locations have an empty area at the top of the mesh. A fog volume must be a closed surface, so the top of the mesh must be tessellated into simple areas, such as triangles, that a rendering engine can interpret as surfaces.

The preferred embodiment closes the top of an area volume one of two ways. If the area is defined by three points, these are assumed to define a single triangle that closes the top. If the area is defined by four points, the top of the wall is a quadrilateral. A line is drawn between two non-consecutive points. The line is entirely inside or entirely outside the quadrilateral. If it is outside, it is replaced with a line connecting the other two non-consecutive points—this line is then entirely inside the quadrilateral. The line is then used to divide the top into two triangles, which close the top of the mesh. The preferred embodiment does not allow areas made from more than four skeleton vertices.

An alternative approach allows area locations with an arbitrary number of skeleton points. This approach begins by making a copy of the top ring of the mesh. It then considers three consecutive vertices at a time. It draws a line between the first and third vertex, and tests for intersections between this line and the segments of the ring. If no intersection is found, the three vertices are recorded as a triangle and the second vertex is eliminated from the copy of the ring. If, on the other hand, an intersection is found, then consideration moves on to the second, third, and fourth vertices. This process repeats, potentially looping through the ring vertices several times, until three vertices remain, forming the last triangle. The list of recorded triangles now forms the cap of the mesh for the area-shaped location.

A third approach would be to use standard triangulation methods, such as Delauney or Dirichlet triangulation to generate a list of triangles and perhaps additional vertices, in a well-conditioned cap.

Rendering a Fog Volume—Basics

In the preferred embodiment of the invention, the fog volume is defined by a triangle or quadrilateral mesh, and rendered using OpenGL. It is necessary to determine the appearance of the volume at the vertices of the mesh. All vertices are assigned the same color (red, blue, and green). Each vertex is assigned an opacity, depending on the content of the fog volume.

The opacity of a vertex is determined as follows. The direction of a ray to the vertex from the vantage point of the image is calculated. The extension of the ray is then followed to determine the distance it travels before exiting the volume, by intersecting terrain or the fog volume mesh. The distance traveled to the nearest ground intersection and to the nearest mesh intersection is calculated, and the smaller of the two is retained. The density encountered by the ray during its traverse through the fog volume is determined and accumulated, and this accumulated density is converted into an opacity. With the resulting opacity varying between 0.0 and 1.0, the fog volume is semi-transparent. A rendering engine, such as OpenGL can use any of many standard blending techniques to mix the fog volume's color with the color of the original image, with higher opacity resulting in more fog color.

Opacities are only calculated at mesh vertices, so OpenGL linearly interpolates opacity along the facets of the mesh between the vertices. To provide a more realistic fade between vertices, accumulated density could be mapped to a non-linear, one-dimensional texture rather than a color, and the texture between the vertices could then be mapped.

Rendering a Fog Volume—Determining Ray-Volume Intersection

To determine the density encountered by a ray through a vertex, the distance traveled prior to exiting the fog volume is determined. During mesh construction, the normal of each facet of the fog volume mesh is determined. By construction, the outward pointing facets have a positive vertical component. The dot product of the outward pointing normal of a facet with the ray from the vantage point is negative if and only if the ray exits through the facet. Whether a particular facet is an "entry facet" or an "exit facet" can then be tested. This fact can be used to perform two tests. First, whether the facets that contain the vertex are entry or exit facets is tested. If any are exit facets, then the vertex is its own exit point, and the distance traveled inside the volume is zero. This happens when the ray does not penetrate the volume (mixed entry and exit facets) or the vertex is on the far side of the volume (only exit facets). Second, if the neighboring facets are all entry facets, the ray is tested for intersection with the remaining exit facets of the mesh, choosing the nearest intersection as the ray exit point. If no intersection is found, then the distance traveled inside the mesh is presumed infinite.

An alternative is to use a parametric equation to determine exit distance. The mesh for a point-shaped location approximates an ellipsoid with axes defined by the horizontal and vertical fall-off distances specified in the membership function. Given an entry point and a direction, the distance traveled before exiting the ellipsoid can be defined analytically. However, this approximation is only valid for point-shaped locations. Parametric equations for arbitrary, multi-segmented lines and areas are more complex.

Rendering a Fog Volume—Determining Ray-Ground Intersection

The intersection of the ray with the terrain must be tested. The preferred embodiment of the invention tests for intersection of the ray with the subset of terrain model triangles that underlie the mesh. When creating the mesh, the set of terrain polygons that underlie the mesh are determined. This is done in two steps. First, any vertices of the terrain model that lie inside the horizontal bounding box of the mesh perimeter are located. Terrain triangles that use these vertices underlie the volume. Second, any additional terrain triangles that contain vertices of the mesh perimeter are located. This method may detect some terrain triangles that intersect the bounding box of the mesh but not the mesh itself.

There are several alternate ways to detect terrain collisions, all of which are slower.

1. Search grids. Prior to searching for ray/terrain intersections, divide the terrain, in overhead view, into a rectangular grid. Generate the smallest sphere (or alternately the tightest vertical cylinder) that encompasses all terrain polygons inside the grid. When searching for intersection, first test whether the ray intersects each sphere (or cylinder), and only if it does, test the terrain polygons inside the sphere.

2. Smarter search grids. Generate the same regular grid, and record the terrain polygons that fall at least partly inside each grid rectangle. First search for ground intersections in the grid where the ray enters the volume. If none are found, calculate where the ray exits this grid, thereby determining the next grid it enters, and search for ground intersections in that grid. Repeat this process until an intersection is found, or there are no more terrain polygons. This should be faster than the previous method, as it need not test ray intersection with each grid rectangle.

3. Frustum culling. Determine the subset of terrain polygons that fall within the viewing frustum used to render the image. Test each terrain polygon, but only once per scene rather than once per fog volume vertex.

Rendering a Fog Volume—Density Accumulation

After determining where the ray exits the fog volume, the fog volume's density function is applied to accumulate the density through which the ray travels. In the preferred embodiment of the invention, fog density is constant throughout the volume. Therefore, the accumulated density is simply the constant density multiplied by the distance traveled inside the volume. The distance traveled by a ray entering through a vertex is the distance from that vertex to the closer of the volume intersection point or ground intersection point, calculated above. While constant density is not consistent with the Gaussian membership function for the original fuzzy set, it greatly simplifies calculation, and alpha calculation (below) will make the required conversion to a Gaussian distribution.

One possible addition would account for vertices seen from inside the fog volume. When a vertex is considered to be its own exit because it is on a back facing facet, the preferred embodiment assumes zero distance traveled. However, if the vantage point is inside the fog volume, a better choice might be to use the distance from vantage point to vertex.

An alternative means of calculating accumulated density assumes density proportional to distance from a point-shaped location. To implement this, after calculating the ray exit point, the closest approach of the ray to the point location is calculated, as a fraction of the membership function's fall-off distance. This fraction also determines the density at this point. For rays exiting through the mesh, density rises almost linearly from zero at the entry and exit points to this maximum value. Geometry shows that the accumulated density is then half the maximum density, multiplied by the distance traveled. Unfortunately, this method is not very suitable for line-shaped or area-shaped locations.

Rendering a Fog Volume—Alpha Calculation

The final step is to convert from accumulated density to opacity, with 0.0 meaning completely transparent and 1.0 meaning completely opaque. The standard approach for fog rendering is to use the following equation, where density is the fog volume density and distance is the distance traveled through the volume.

$$\text{Opacity} = (1 - \exp(\text{density} * \text{distance})).$$

The preferred embodiment uses the following equation instead, where, diameter is twice the fall-off distance of the membership function, and $\sigma$ is a parameter.

$$\text{Opacity} = (\exp(((\text{distance}/\text{diameter})^2 - 1)\sigma^2) - \exp(-1/\sigma^2)) * \text{density}/(1 - \exp(-1/\sigma^2)).$$

The equation renders a spherical fog volume in two dimensions as a scaled Gaussian distribution. A true Gaussian would have the form $A*\exp(-x^2/2\sigma^2)$, where x is the distance from the Gaussian center. A ray passing through a sphere, has its closest approach to the sphere center at distance x, given by $x^2 = r^2 - d^2$, where r and d are the sphere radius and half the distance traveled through the sphere. Dividing this equation by $r^2$, combining it with the previous equation, and absorbing a factor of 2 into $\sigma^2$ prior to assigning it an actual value, it is found that the true Gaussian differs from the first term of the opacity equation by only the scale factor A. The second term of the equation shifts the value to 0.0 when distance is 0.0, at the edges of the volume. The remaining terms implement A, scaling the opacity to density for a ray passing through the center of the volume. Thus, using the above alpha calculation, a scaled Gaussian probability distribution, implemented as opacity is determined.

The scaling factors have the effect of only representing a piece of the Gaussian curve. The center of the Gaussian is always at the center of the fog volume, and the parameter $1/\sigma^2$ controls the point along the curve that is mapped to zero. The higher the value of $1/\sigma^2$, the more of the Gaussian curve that is used. Thus, using low $1/\sigma^2$ causes opacity to fall off slowly near the center of the volume, and drop ever quicker as it approaches the volume edges. Conversely, using high $1/\sigma^2$ causes opacity to drop quickly near the center of the volume, then ever more gradually around the edges. The preferred embodiment uses the value of 2.3, which seems visually satisfying.

For line-shaped and area-shaped locations, rays through vertices may travel a distance in excess of twice the fall-off distance. For this reason, distance is clamped to be no more than diameter.

Multiple Object Types of Interest

As mentioned before, each fog volume is assigned a color, and blends more of less of that color with the background image depending on the density of the fog volume. Fog volumes of the same color can be used to predict objects in multiple regions of an image. Fog volumes of different colors can be used to predict multiple, distinct types of objects of interest. Where such fog volumes overlap, it is preferred to show both simultaneously, rather than having one occlude the other. Further, as color indicates a type of object, it may be desirable not to blend the colors of two volumes, potentially creating a false prediction of a third type of object, coincidentally represented by the blended color.

Figure 4:
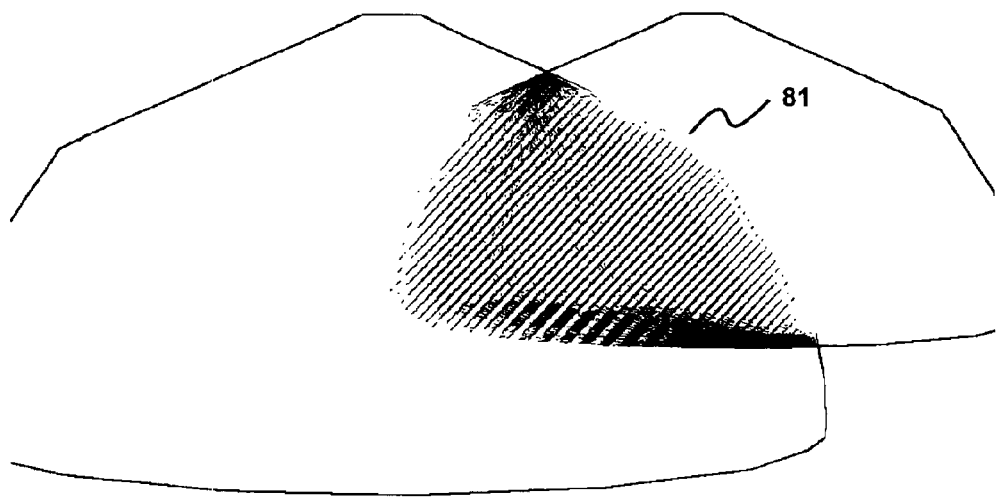
FIG. 4 is an image showing how cross-hatching depicts overlapping fog volumes of different colors without blending the colors.

One way to solve this problem is to cross hatch the areas where heterogeneous fog volumes overlap, as shown in FIG. 4 by cross-hatched area 81. This maintains the presence of both colors, and their associated meanings in the overlapping area. The cross hatching could show additional information by using different widths for lines of the various colors, for instance indicating the relative proximity of overlapping fog volumes by the relative thickness of the stripes. The cross hatching could be temporal rather than spatial, blinking or fading between colors in successive image frames. Or, it could be both temporal and spatial (animated), for instance sliding or swapping the positions of the hatch marks in successive frames, to prevent the illusion that a particular pixel should be one color, even though its color within the hatching is coincidental.

The preferred embodiment of cross-hatching is two-pass rendering using a stencil buffer containing a pattern of diagonal stripes. For illustration, consider the case of rendering two sets of fog volumes, one red and one blue. The first pass renders red volumes before blue volumes and uses the stencil buffer to allow rendering only on even stripes. The second pass renders blue volumes before red ones, and writes only to odd stripes. Both passes use alpha blending, as opposed for instance to "screen" or "multiply" blending. Where no objects overlap, the method is equivalent to one pass rendering with no stencil buffer. Where objects overlap, the method produces alternating stripes of red and blue, the dominant color in a particular stripe being that of the fog volume drawn in the second pass. Each stripe fades from red to blue however, at the edge of the volume whose color dominates the stripe, as that volume's intensity fades. Vertex opacity is calculated based on total density encountered by a ray, as described above, even if this density was accumulated from fog volumes of different colors. As a result, intensity is nearly matched on either side of the edge of a cross-hatched region, providing a nice fade across the edge.

Other embodiments will occur to those skilled in the art and are within the scope of the following claims.

What is claimed is:

1. A method to graphically display the level of confidence that an object at any given image location is an object of interest, comprising:

displaying an image;

defining one or more image locations where objects of interest are likely to exist;

defining a function for each location, the function giving the probability of an object of interest occurring versus distance from the location;

defining a visual display parameter to represent each function;

rendering each visual display parameter from the vantage point of the image; and overlaying the rendered visual display parameter on the display of the image.

2. The method of claim 1, wherein the rendering step comprises rendering the visual display parameter such that the display parameter varies in accordance with the probability given by the function.

3. The method of claim 2, wherein the visual display parameter comprises the opacity of an overlay.

4. The method of claim 3, wherein the opacity of the overlay is directly related to the probability given by the function.

5. The method of claim 1, wherein the visual display parameter comprises a fog volume.

6. The method of claim 5 wherein the overlaying step comprises using fog volumes of different colors to indicate different objects of interest.

7. The method of claim 5, wherein the rendering step renders overlapping fog volumes using cross hatching, so that any given image pixel receives color from only one volume.

8. The method of claim 7, further comprising determining the proximity of two overlapping volumes, and wherein the cross hatching is accomplished with cross hatched lines that are given a relative thickness related to the proximity of the two overlapping volumes.

9. The method of claim 7, wherein the cross hatching is varied with time.

10. The method of claim 5, wherein rendering step comprises rendering the fog volume such that the opacity of the skeleton vertices is a function of distance within the fog volume.

11. The method of claim 5, wherein the fog volume comprises a description of a closed surface and a description of the density of particles contained inside the surface.

12. The method of claim 11, wherein the fog volume closed surface is defined by a lower perimeter, a wall, and a cap.

13. The method of claim 12, wherein the wall is defined by a plurality of area perimeters, with one or more area perimeters spaced from one another and spaced from the lower perimeter.

14. A method to graphically display the level of confidence that an object at any given image location is an object of interest, comprising:

displaying an image;

defining one or more image locations where objects of interest are likely to exist;

defining a function for each location, the function giving the probability of an object of interest occurring versus distance from the location;

defining a visual display parameter to represent each function, wherein the visual display parameter comprises a fog volume;

rendering each visual display parameter from the vantage point of the image, comprising rendering the visual display parameter such that the display parameter varies in accordance with the probability given by the function; and overlaying the rendered visual display parameter on the display of the image.

15. The method of claim 14, wherein the overlaying step comprises using fog volumes of different colors to indicate different objects of interest.

16. The method of claim 14, wherein rendering step comprises rendering the fog volume such that the opacity of the skeleton vertices is a function of distance within the fog volume.

17. The method of claim 14, wherein the fog volume comprises a description of a closed surface and a description of the density of particles contained inside the surface.

* * * * *